United States Patent [19]

Turner et al.

[11] Patent Number: 4,714,779

[45] Date of Patent: Dec. 22, 1987

[54] AROMATIC ARYL AMINE POLYMERS

[75] Inventors: S. Richard Turner, Bridgewater, N.J.; John F. Yanus, Webster, N.Y.

[73] Assignee: Xerox Corporation, Stamford, Conn.

[21] Appl. No.: 208,605

[22] Filed: Nov. 20, 1980

[51] Int. Cl.$^4$ .............................................. C07C 87/50
[52] U.S. Cl. .................................................. 564/330
[58] Field of Search ................................ 564/315, 330

[56] References Cited

U.S. PATENT DOCUMENTS

| | | | |
|---|---|---|---|
| 2,290,860 | 7/1942 | Burk et al. | 564/330 X |
| 3,251,881 | 5/1966 | Susi et al. | 260/576 |
| 3,265,496 | 8/1966 | Fox | 96/1 |
| 3,452,038 | 6/1969 | Randall et al. | 564/330 X |
| 3,544,637 | 12/1970 | Kober et al. | 564/330 X |
| 3,828,071 | 8/1974 | Kast et al. | 564/330 X |

OTHER PUBLICATIONS

Creason et al., "J. Org. Chem.", vol. 37, No. 26, pp. 4440-4446 (1972).

*Primary Examiner*—Robert V. Hines
*Attorney, Agent, or Firm*—Peter H. Kondo

[57] ABSTRACT

A polymer of the formula

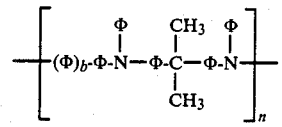

wherein
 $\Phi$ = phenyl or phenylene
 b = 0, 1, 2 or 3
 n = 3 or greater.

3 Claims, No Drawings

AROMATIC ARYL AMINE POLYMERS

This invention relates in general to aromatic arylamine polymers and more specifically to polymers having utility in an electrophotographic imaging member.

The number of known organic reactions is tremendously large, e.g., note the size of an elementary organic textbook, yet the number of these reactions that lend themselves to the formation of usable polymeric materials via a step growth process is extremely small. The anomaly is readily understood by consideration of the factors necessary to obtain high molecular weight in a polymer forming step growth reaction. This has been described by the Carothers equation where the DP, degree of polymerization, is related to the reaction conversion, P, by $DP=1/1-P$. This equation says that reaction conversions have to be extremely high, greater than 95%, in order to obtain molecular weights high enough to impart any reasonable mechanical properties to the polymer. Very few of the numerous organic reactions known actually fit this criteria because of the presence of side reactions, etc.

The Ullman coupling and Ullman condensation reactions have been known for many years and, despite their usefulness as a synthetic tool, in most cases, these reactions have been unsuited for high polymer formation. An exception to this has been the formation of polyethers from aryl halides and the disodium salt of bisphenol A. This is at least partially due to the relative ease of alkoxide or aryloxide Ullman condensation with aryl halides in small molecule systems.

This is contrasted to the poor reactions of diaryl amines and aromatic halides to form triaryl amines. Work on the Ullman condensation of diaryl amines and aromatic iodides has resulted in Applicants developing a superior process for the preparation of triaryl amines. This process has been detailed in copending U.S. application Ser. No. 118,147, filed Feb. 4, 1980 and non abandoned. The results of this work has led to heretofore unknown aromatic amine polymer structures which are claimed herein.

Polymers that exhibit high charge carrier mobilities, when utilized in an electrophotographic imaging member comprising a charge generation layer and a charge transport layer, are relatively few in number. No polymer, to date, has exhibited the charge carrier mobilities exhibited by certain small molecules, such as, bis(4-diethylamino-2-methylphenyl)-phenyl methane dissolved in a matrix polymer. A practical hole transporting polymer, e.g. one having good electronic and mechanical properties, has been and continues to be a desirable alternative to the small molecule/polymer matrix composites now appearing in the patent literature. Issues such as long term phase compatibility would be eliminated in a system where the polymer per se is charge transporting.

PRIOR ART STATEMENT

U.S. Pat. No. 3,265,496 is directed to a photoconductive material for use in electrophotography. This material includes a polytriphenyl amine polymer which is distinct from the polymers claimed in the instant application.

U.S. Pat. No. 3,251,881 is directed to N,N,N',N'-tetrakis(p-substituted-phenyl)-p-phenylene diamines and benzidines. This patent does not include the polymers of the instant invention.

The present invention provides polymers of the formula:

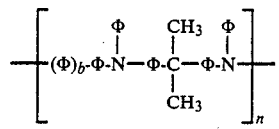

wherein
$\Phi$=phenyl or phenylene
b=0, 1, 2, 3
n=3 or greater

Noninterfering substituents may be present on the phenyl or phenylene groups, for example $C_1$-$C_6$ alkyl groups, $C_1$-$C_6$ acyl or alkoxy groups, etc.

These polymers are prepared by reacting the appropriate dihalide e.g. diiodide, dichloride and dibromide with the appropriate diamine. The reaction proceeds most effectively when the dihalide is the diiodide and the reaction is conducted in an inert atmosphere, e.g. argon, nitrogen, etc., with potassium hydroxide in the presence of powdered copper catalyst and an inert saturated hydrocarbon solvent or in the absence of a solvent and the reaction temperature is limited to between about 120°–190° C.

The contemplated polymers within the scope of the above-identified formula can be prepared by reacting 4,4'-isopropylidene bis(diphenylamine) with one or more of the following diiodo compounds:

4,4'-diiodobiphenyl;
1,4-diiodobenzene;
4,4''-diiodoterphenyl;
4,4'''-diiodoquatraphenyl; and
2,2-bis(4-iodophenyl)propane or by reacting bis[4-iodophenyl] isopropylidene with one or more of the following diamines:

N,N'-diphenyl-[1,1'-biphenyl]-4,4'-diamine;
N,N'-diphenyl-[phenylene]-1,4-diamine;
N,N'-diphenyl-[p,p''-terphenyl]-4,4''-diamine;
N,N'-diphenyl-[p,p'''-quatraphenyl]-4,4'''-diamine; and
4,4'-isopropylidene bis(diphenylamine)

The polymers of the present invention will have chain lengths of at least three repeating units with molecular weights ranging from about 5000 to 70,000 or higher.

The following examples further specifically define the present invention with respect to the method of making the polymers and a photosensitive member utilizing the same. The percentages are by weight unless otherwise indicated.

EXAMPLE 1

This example details the preparation of the polymer resulting from the condensation of 4,4'-isopropylidene bis(diphenylamine) and 4,4'-diiodobiphenyl.

In a 100 ml, three-necked round bottom flask equipped with a mechanical stirrer and purged with argon were placed 9.3 grams (0.025 mole) of 4,4'-isopropylidne bis(diphenylamine), 16.9 grams (0.3 mole) of potassium hydroxide flakes, 7.5 grams of copper powder and 25 mls of tetrahydronaphthalene. With the aid of an oil bath, the mixture was heated to 170° C. with stirring for one hour. The 4,4'-diiodobiphenyl, in the amount of 10.3 grams (0.025 mole), was added and the heterogeneous mixture allowed to stir for 18 hours. The reaction was cooled and 25 mls of tetrahydrofuran was added and brought to reflux. The liquid portion was decanted and the tetrahydrofuran reflux wash was repeated three times. The resulting solution was filtered and a fine yellow precipitate formed on addition of one liter of ethanol. The precipitate was dissolved in toluene and precipitated into acetone. This toluene-acetone sequence was repeated. The product was again dissolved in toluene and column chromatographed on Florisil, i.e. a magnesium silicate. The colorless eluent was precipitated into ethanol and dried to yield (65%) of a colorless powder. This polymer had an $\overline{M}n$ of 10,000 and an $\overline{M}w$ of greater than 20,000 as determined from a gel permeation chromatography analysis and vapor phase osmometry.

EXAMPLE II

This example details the preparation of the polymer resulting from the condensation of 2,2-bis(4-iodophenyl) propane and N,N'-diphenyl[phenylene]-1,4'-diamine.

Using the same process as Example I, 6.5 grams (0.025 mole) of N,N'-diphenyl-[phenylene]-1,4-diamine, 16.9 grams (0.3 mole) of potassium hydroxide flakes, 7.5 grams of copper powder and 25 mls of tetahydronaphthalene are combined and heated to 170° C. with stirring for one hour. The 2,2-bis(4-iodophenyl) propane, in the amount of 11.1 grams (0.025 mole), is added and the heterogeneous mixture stirred for 18 hours. The reaction is cooled and 25 mls of tetrahydrofuran added and brought to reflux. The liquid portion is decanted and the tetrahydrofuran reflux was repeated three times. The resulting solution is filtered and a precipitate is formed on addition of a liter of ethanol. The precipitate is dissolved in toluene and precipitated into acetone. This purification sequence is repeated and a toluene solution of the precipitate is column chromatographed on Florsil, i.e. a magnesium silicate. The eluent is precipitated into ethanol and the precipitated polymer is isolated and dried.

The polymers of the instant invention have utility in electrophotography as charge transport materials. For example, the polymer of Example I, when employed as a 5 micron hole transport layer deposited upon a 0.5 micron thick layer of amorphous selenium, which in turn had been deposited on a 3 mil aluminum substrate, functioned with highly efficient hole mobility. The hole mobility was larger than $3 \times 10^{-5}$ cm$^2$/volt second.

The invention has been described in detail with particular reference to preferred embodiments thereof but it will be understood that variations and modifications can be effected within the spirit and scope of the invention as described hereinabove and as defined in the appended claims.

What is claimed is:

1. A polymer of the formula

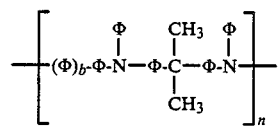

wherein
  $\Phi$=phenyl or phenylene
  b=0, 1, 2, or 3
  n=3 or greater.

2. A polymer according to claim 1 resulting from the condensation of one or more of the following diamines:
  N,N'-diphenyl-[1,1'-biphenyl]-4,4'-diamine;
  N,N'-diphenyl-[phenylene]-1,4-diamine;
  N,N'-diphenyl-[p,p''-terphenyl]-4,4''-diamine;
  N,N'-diphenyl-[p,p'''-quatraphenyl]-4,4'''-diamine; and
  4,4'-isopropylidene bis(diphenylamine)
with one or more of the follwing diiodo compounds:
  4,4'-diiodobiphenyl;
  1,4-diiodobenzene;
  4,4''-diiodoterphenyl;
  4,4'''-diiodoquatraphenyl; and
  2,2'-bis(4-iodophenyl)propane.

3. A polymer according to claim 1, having a molecular weight ranging from about 5,000 to about 70,000.

* * * * *